United States Patent Office 3,043,791
Patented July 10, 1962

3,043,791
PLASTIC COMPOSITION COMPRISING POLYVINYL CHLORIDE AND AN ESTER OF 2,2,4,4-TETRA ALKYL CYCLOBUTANE-1,3-DIOL
James C. Martin and Kent C. Brannock, Kingsport, Tenn., assignors to Eastman Kodak Company, Rochester, N.Y., a corporation of New Jersey
No Drawing. Filed Sept. 28, 1959, Ser. No. 842,597
6 Claims. (Cl. 260—31.6)

This invention relates to polyvinyl chloride resins, and more particularly, to a new plasticizer for polyvinyl chloride resins.

It is an object of this invention to provide a new polyvinyl chloride resin composition.

It is likewise an object of this invention to provide polyvinyl chloride resins plasticized with a new group of ester plasticizers.

It is another object of this invention to provide new ester plasticizers for polyvinyl chloride resins having low volatility, resistance to water leaching and hydrolysis, and compatibility with polyvinyl chloride resins.

These and other objects of the invention are accomplished by means of this invention as described more fully hereinafter with reference to preferred embodiments thereof.

The novel class of plasticizer compounds embodying the invention are diesters of 2,2,4,4-tetraalkylcyclobutane-1,3-diol having the following structural formula:

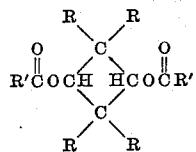

wherein R is an alkyl radical having 1 to 2 carbon atoms and R' is hydrogen or an alkyl radical having 1 to 3 carbon atoms. The R' substituent can be either straight or branched chain alkyl groups. Typical esters of the invention include such compounds as:

2,2,4,4-tetramethylcyclobutane-1,3-diol diformate
2,2,4,4-tetramethylcyclobutane-1,3-diol diacetate
2,2,4,4-tetramethylcyclobutane-1,3-diol di-n-propionate
2,2,4,4-tetramethylcyclobutane-1,3-diol di-n-butyrate
2,2,4,4-tetramethylcyclobutane-1,3-diol diisobutyrate
2,4-dimethyl-2,4-diethylcyclobutane-1,3-diol diacetate
2,2-dimethyl-4,4-diethylcyclobutane-1,3-diol diisobutyrate
2,2,4,4-tetraethylcyclobutane-1,3-diol diacetate
2,2,4,4-tetraethylcyclobutane-1,3-diol diformate
2,2,4,4-tetraethylcyclobutane-1,3-diol di-n-butyrate, and related esters of
2,2,4,4-tetraalkylcyclobutane-1,3-diols The esters of the present invention can be prepared by esterifying one molar proportion of a 2,2,4,4-tetraalkylcyclobutane-1,3-diol with two molar proportions of a saturated monocarboxylic acid having 1 to 4 carbon atoms. A single monocarboxylic acid or mixtures of more than one monocarboxylic acid can be used to esterify the subject diols. This esterification reaction can be effected at a temperature of about 175° to 250° C. At such reaction temperatures the esterification can be effected in the absence of an esterification catalyst. However, lower reaction temperatures can be employed with catalytic amounts of such esterification catalysts as zinc chloride, sulfuric acid and hydrochloric acid. Other well-known esterification methods can also be employed including the use of a carboxylic acid chloride or anhydride in lieu of a carboxylic acid reactant.

The preparation of 2,2,4,4-tetraalkylcyclobutane-1,3-diols from the corresponding diones by hydrogenation in the presence of ruthenium is described in detail in the copending application of Hasek and Elam U.S. Serial No. 728,083 which was filed April 14, 1958, now U.S. Patent No. 2,936,324.

The subject esters have utility as plasticizers for the well-known solid polyvinyl chloride resins. It is common practice in the art to modify the properties of polyvinyl chloride resins by the addition of various materials having a plasticizing or softening action. As plasticizing materials are added to polyvinyl chloride in relatively large amounts, oftentimes the plasticizer comprising a major portion of the composition, the properties of the plasticizer are very important. It is a requisite of good plasticizing materials that they have such properties as low volatility, water resistance and compatibility with the resin being plasticized. Low boiling plasticizers evaporate slowly on standing at room temperature or at temperatures to which the polyvinyl chloride resin is subjected to, either in preparation or in use. As a result, films or molded articles thereof become brittle and may easily crack or break. Also, resins may be subjected to water in their use. If the plasticizer is water soluble to even a small extent, the plasticizer is ultimately leached out. If the plasticizer is not compatible in the proportions generally utilized in polyvinyl chloride resins, the plasticizer either cannot be effectively incorporated therein or it will exude from films and molded articles thereof to give an oily feel to these articles. Here again, loss of the plasticizer material from the resin results in a reversion to the resin's original hardness and brittleness. The esters of the invention have low volatility, are insoluble in water and are compatible with polyvinyl chloride resins, and hence, are effective plasticizer materials for polyvinyl chloride resins.

The ester plasticizers of the invention also have high thermal and hydrolytic stability which make these materials desirable plasticizers for polyvinyl chloride resins. When the esters of the invention are incorporated into polyvinyl chloride resins as plasticizers they do not break down under the same thermal conditions that cause some plasticizers to be degraded. In the commercial molding of polyvinyl chloride resins, some waste or scraps are obtained which cannot be remelted and molded again if degradation of the plasticizer has occurred. Hence, the thermally stable esters of the invention have considerable utility as plasticizers.

The esters of the invention are used in polyvinyl chloride resins in plasticizing amounts, usually at concentrations of about 40% to 70%, with concentrations of about 45% to 65% being preferably used. The aforementioned concentrations are based on the combined weight of the polyvinyl chloride resin and the plasticizer.

The esters of the invention can be incorporated into polyvinyl chloride resins as plasticizers therefor by conventional methods. A preferred method of incorporation is blending by milling on heated rolls.

The novel ester plasticizers described herein can also be used to plasticize cellulose acetate butyrates, amounts of the ester plasticizer of the magnitude of 5% to 40% by weight based on the combined weight of the cellulose acetate butyrate and the plasticizer being used for this purpose. Likewise, higher carboxylic acid esters of 2,2,4,4-tetramethylcyclobutane-1,3-diol such as 2,2,4,4-tetramethylcyclobutane-1,3-diol bis(2-ethyl hexanoate) can be used to plasticize cellulose acetate butyrates. However, such higher carboxylic acid diesters do not exhibit substantial plasticizing properties in polyvinyl chloride resins, this illustrating the element of unpredictability in the art of plasticizing resins or plastics.

In addition to being useful as plasticizers, the esters of the invention also have utility as synthetic lubricants, heat transfer oils, hydraulic fluids and for other uses requiring materials having such properties as high thermal and hydrolytic stability, high boiling point, high flash point, good temperature-viscosity characteristics, water insolubility and related properties inherent to the novel esters of the invention.

The invention is further illustrated by the following examples which include the preparation of typical plasticizing esters of the invention, as well as various properties and uses of such esters.

EXAMPLE 1

A solution of 321 g. (2.23 moles) of 2,2,4,4-tetramethylcyclobutane-1,3-diol, 276 g. of formic acid (6 moles) and 200 ml. of benzene was refluxed for 5 hours. The reaction solution was cooled, 276 g. of formic acid was added and refluxing was continued for 4 hours. Upon cooling, the solution was diluted with benzene, washed with water, diluted with sodium bicarbonate solution, again washed with water and finally dried over anhydrous sodium sulfate. The resulting organic layer was distilled through a 48 inch packed column to give 315 g. (70% yield) of 2,2,4,4-tetramethylcyclobutane-1,3-diol diformate, B.P. 132–133° C. (53 mm.). The prepared diester had a purity of 98% as determined by gas chromatography.

EXAMPLE 2

A 450 g. (4.4 moles) portion of acetic anhydride and 2 g. of anhydrous zinc chloride were added to 296.5 g. (2.06 moles) of 2,2,4,4-tetramethylcyclobutane-1,3-diol. The resulting mixture began to reflux spontaneously and all of the diol dissolved within a few minutes. The mixture was allowed to stand for about 15 hours, refluxed for 2 hours, cooled to room temperature and then filtered. The acetic acid in the resulting mixture was removed by distillation and thereafter 431 g. of 2,2,4,4-tetramethylcyclobutane-1,3-diol diacetate was distilled off at a temperature of 110° to 112° C. (13 mm.). This ester material had the following analysis based on the empirical formula, $C_{12}H_{20}O_4$:

Saponification equivalent (found)=114.5
Saponification equivalent (calculated)=114

EXAMPLE 3

A solution of 650 g. (4.5 moles) of 2,2,4,4-tetramethylcyclobutane-1,3-diol and 3 g. of zinc chloride in 1500 g. (9.5 moles) of isobutyric anhydride was refluxed for 6 hours. Distillation of this reaction product gave isobutyric acid, isobutyric anhydride and 1204.7 g. (94% yield) of 2,2,4,4-tetramethylcyclobutane-1,3-diol diisobutyrate, B.P. 135° C. (5.5 mm.), $n_D^{20}$ 1.4397. The ester product had the following analysis based on the empirical formula $C_{16}H_{28}O_4$:

| Found | Calculated |
| --- | --- |
| C=67.4%<br>H=10.1%<br>Sapon. Equiv.=142.1 | C=67.6%<br>H=9.9%<br>Sapon. Equiv.=142 |

EXAMPLE 4

A solution of 650 g. (4.5 moles) of 2,2,4,4-tetramethylcyclobutane-1,3-diol and 3 g. of zinc chloride in 1500 g. (9.5 moles) of n-butyric anhydride was reacted as described in Example 3 to give 1130.6 g. (88% yield) of 2,2,4,4-tetramethylcyclobutane-1,3-diol di-n-butyrate, B.P. 135° C. (5.5 mm.), $n_D^{20}$ 1.4397. The ester product had the following analysis based on the empirical formula $C_{16}H_{28}O_4$:

| Found | Calculated |
| --- | --- |
| C=67.5%<br>H=10.0%<br>Sapon. Equiv.=142.5 | C=67.6%<br>H=9.9%<br>Sapon. Equiv.=142 |

EXAMPLE 5

Fifty parts by weight of polyvinyl chloride (specific gravity 1.40, specific viscosity 0.53, "Geon 101 EP" sold by B. F. Goodrich Company) and 50 parts by weight of 2,2,4,4-tetramethylcyclobutane-1,3-diol diisobutyrate were substantially uniformly mixed on heated rolls and extruded into sheets. Similar sheets were prepared by substituting the diformate, the diacetate and the di-n-butyrate esters of 2,2,4,4-tetramethylcyclobutane-1,3-diol for the diisobutyrate ester. The prepared sheets were clear and pliable. Molded articles prepared from the resulting plasticized polyvinyl chloride resin compositions have high impact strength, good resistance to thermal degradation, and low hydrolytic breakdown as measured by molecular weight lowering during prolonged exposure to hot water. Additionally, the ester plasticizers in the polyvinyl chloride showed high resistance to extraction by water and good compatibility therewith. The polyvinyl chloride is similarly plasticized with 50% by weight, based on the entire composition, of 2,2,4,4-tetraethylcyclobutane-1,3-diol diisobutyrate.

EXAMPLE 6

A series of samples of polyvinyl chloride (specific gravity 1.40, specific viscosity 0.53, "Geon 101 EP" sold by B. F. Goodrich Company), having varying amounts of 2,2,4,4-tetramethylcyclobutane-1,3-diol diisobutyrate incorporated therein as a plasticizer were subjected to several conventional tests to determine the physical properties thereof. The results of the various tests are summarized by the data set out in the table below. The amount of plasticizer is indicated in the table as percent by weight based on the combined weights of the plasticizer and the polyvinyl chloride.

*Table*

| Property | Amount of Plasticizer | |
| --- | --- | --- |
| | 50% | 66% |
| Tensile strength (p.s.i., at fracture, 73.4° F., 50% R.H.) | 4,240 | 3,780 |
| Volatility (percent weight loss at 110° C. in 24 hr.) | 2.6 | 3.5 |
| Impact strength (button) | 39.8 | 42.8 |
| Elongation (percent, 73.4° F., 50% R.H.) | 220 | 240 |
| Water absorption (percent, 24 hr. immersion in water) | .15 | .20 |
| Material leached out (percent, 24 hr. immersion in water) | .13 | .16 |

Thus, the present invention provides new polyvinyl chloride resin compositions plasticized with new ester materials particularly adapted for this purpose.

Although the invention has been described in considerable detail with reference to certain preferred embodiments thereof, it will be understood that variations and modifications can be effected within the spirit and scope of the invention as described hereinabove and as defined by the appended claims.

This application is a continuation-in-part of our co-pending applicatoin titled "Esters of 2,2,4,4-tetraalkylcyclobutane-1,3-diols," U.S. Serial No. 805,731, filed April 13, 1959, and now abandoned.

We claim:

1. A plastic composition comprising polyvinyl chloride resin and a plasticizing amount of a plasticizer having the formula

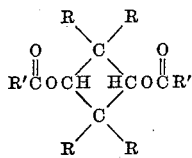

wherein R is an alkyl radical having 1 to 2 carbon atoms, and wherein R' is selected from the group consisting of hydrogen atoms and alkyl radicals having 1 to 3 carbon atoms, said plasticizing amount being 40% to 70% by weight based on the combined weights of said polyvinyl chloride and said plasticizer.

2. A plastic composition comprising polyvinyl chloride resin and a plasticizer having the formula

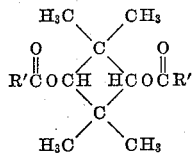

wherein R' is selected from the group consisting of hydrogen atoms and alkyl radicals having 1 to 3 carbon atoms, said plasticizer being present in amounts of 40% to 70% by weight based on the combined weights of said polyvinyl chloride resin and said plasticizer.

3. A plastic composition comprising polyvinyl chloride resin plasticized with 2,2,4,4-tetramethylcyclobutane-1,3-diol diisobutyrate, the said plasticizer being present in amounts of 45% to 65% by weight based on the combined weights of said polyvinyl chloride resin and the said plasticizer.

4. A plastic composition comprising polyvinyl chloride resin plasticized with 2,2,4,4-tetramethylcyclobutane-1,3-diol di-n-butyrate, the said plasticizer being present in amounts of 45% to 65% by weight based on the combined weights of said polyvinyl chloride resin and the said plasticizer.

5. A plastic composition comprising polyvinyl chloride resin plasticized with 2,2,4,4-tetramethylcyclobutane-1,3-diol diacetate, the said plasticizer being present in amounts of 45% to 65% by weight based on the combined weights of said polyvinyl chloride resin and the said plasticizer.

6. A plastic composition comprising polyvinyl chloride resin plasticized with 2,2,4,4-tetramethylcyclobutane-1,3-diol diformate, the said plasticizer being present in amounts of 45% to 65% by weight based on the combined weights of said polyvinyl chloride resin and the said plasticizer.

References Cited in the file of this patent
UNITED STATES PATENTS

| | | |
|---|---|---|
| 2,576,268 | Shugar et al. | Nov. 27, 1951 |
| 2,936,324 | Hasek et al. | May 10, 1960 |